July 20, 1965 D. W. G. BYATT 3,196,439
RADIO DIRECTION FINDERS
Filed May 9, 1962 2 Sheets-Sheet 1

INVENTOR
Dennis William George Byatt
BY
Baldwin & Wight
ATTORNEYS

July 20, 1965   D. W. G. BYATT   3,196,439
RADIO DIRECTION FINDERS

Filed May 9, 1962   2 Sheets-Sheet 2

INVENTOR
Dennis William George Byatt
BY
Baldwin & Wight
ATTORNEYS

United States Patent Office 3,196,439
Patented July 20, 1965

3,196,439
RADIO DIRECTION FINDERS
Dennis William George Byatt, Great Baddow, Essex, England, assignor to The Marconi Company Limited, London, England, a British company
Filed May 9, 1962, Ser. No. 193,442
Claims priority, application Great Britain, May 15, 1961, 17,570/61
11 Claims. (Cl. 343—113)

The present invention relates to radio direction finders of the type employing geographically spaced receiving aerials and, although not restricted thereto, is primarily concerned with direction finders operating in the H.F. (high frequency) band.

This invention seeks to provide improved direction finders which shall be of high accuracy due to the use of wide spacing or so-called "aperture" of the receiving aerials, which shall not be dependent on the measurement of the relative phases of signals received on the different aerials and which shall be capable of discriminating between signals, resulting from a single transmitted signal, and received at different times due to multiple path transmission (a phenomenon commonly encountered in the H.F. band).

According to this invention a radio direction finder includes means for separately demodulating and differentiating signals received at geographically spaced points from a transmitting modulated signal source and means for measuring or utilising the time interval between corresponding differentiated resultants first produced by a given transmitted signal to ascertain the direction of said source.

Other things being equal the greater the geographical separation of said spaced points the greater the direction finding accuracy. In practice a separation of the order of 20 miles is at present regarded as practical and satisfactory.

It is preferred to effect differentiation and time measurement or utilisation in a common station (which may be at the location of one of the receiving points) and to transmit signals derived from those received at any receiving point remote from said station by radio link means.

Preferably the whole arrangement is such that, for any possible direction of a transmitting source, the differentiated resultant derived from signals from a predetermined one of the receiving points cannot lag behind the corresponding differentiated resultant from any other receiving point at the station where time difference measurement or utilisation is effected. If this is assured the differentiated resultant derived from signals from said predetermined point may be employed to provide a datum time for time measurement and is preferably employed to trigger a deflecting time base for a cathode ray tube arranged distinguishably to display the different differentiated resultants derived from signals received at the different spaced points. Said cathode ray tube may, conveniently, be a direct viewing storage tube.

False operation of the direction finder is likely to occur if the demodulated signals repeat within the maximum time interval, at said measuring or utilisation means, between corresponding signals from the different spaced receiving points. Accordingly, filter means are provided for excluding from the demodulated signals to be differentiated signals having a repetition period not greater than the maximum time interval, at said measuring or utilisation means, between corresponding signals from the different spaced receiving points. Preferably, means are provided, subsequent to said filter means, for squaring the filtered signals.

It will be appreciated that said filter and squaring means may be required where the modulation of the received signals is voice-frequency modulation but that they are not necessary where the signals carry keyed (e.g. Morse) modulation. Accordingly, said filter and squaring means are, preferably, connectable at will.

If desired, means known per se (e.g. a simple conventional direction finder) may be provided for ascertaining the sense of measured signal source directions.

The invention is further described with reference to the accompanying drawings, the figures in which are, for ease of reference, numbered consecutively. In the drawings FIGURE 1 represents schematically a block diagram of one embodiment of the invention; FIGURES 2a to 2c and 3a to 3d are explanatory graphical figures relating to the embodiment of FIGURE 1; and FIGURE 4 shows, so far as is necessary to an understanding of the manner in which it differs from FIGURE 1, a modified embodiment.

Referring to FIGURE 1 there are two H.F. receiving aerials 1a and 1b which may, if desired, be directional aerials spaced apart by a distance of, say 20 miles. The signals from aerial 1a are applied to a broad band amplifier 2 adapted to handle frequencies in the H.F. band and thence to a microwave transmitter 3 where they are modulated on to a microwave signal which is transmitted from a directional transmitting aerial 4, positioned close to aerial 1a, and received on a directional receiving aerial 5 positioned close to aerial 1b. From aerial 5 the microwave signals are applied to a microwave receiver 6 which is adapted to provide as its output the original H.F. signals received on aerial 1a. The H.F. signals from the microwave receiver 6 and from the aerial 1b are each applied to one or other of two H.F. demodulators 7 and 8, to both of which are applied oscillations from a common local oscillator 9. With the ganged switches SW1, SW2, SW3, and SW4 in the positions shown the outputs of the two H.F. demodulators 7 and 8, and which comprise the modulation signals carried on H.F. signals received by aerials 1a, 1b, are applied to differentiators 10 and 11.

The differentiated signals from units 10 and 11 may be utilised in any convenient way, e.g. they may be used to control the movements of the signal source giving rise to the received signals. Preferably, however, the output from differentiator 11 is applied to trigger the time base generator 14 which is adapted to produce a deflection wave for deflecting the two beams of the double beam cathode ray display tube 15. The outputs from differentiators 10 and 11 are also applied to the amplifiers 12 and 13 whose outputs are separately applied to deflect the two beams of the display tube 15 against the time base deflection.

FIGURE 2b shows the differentiated signal such as is obtained at the output of differentiator 10 or 11 and corresponding to the waveform of FIGURE 2a. It will be appreciated that in FIGURE 2b the peak A' corresponds to the face A of the wave of FIGURE 2a and the peaks B', C', D', E' and F' correspond to the appropriately referenced faces of waveform 2a.

Figure 1:
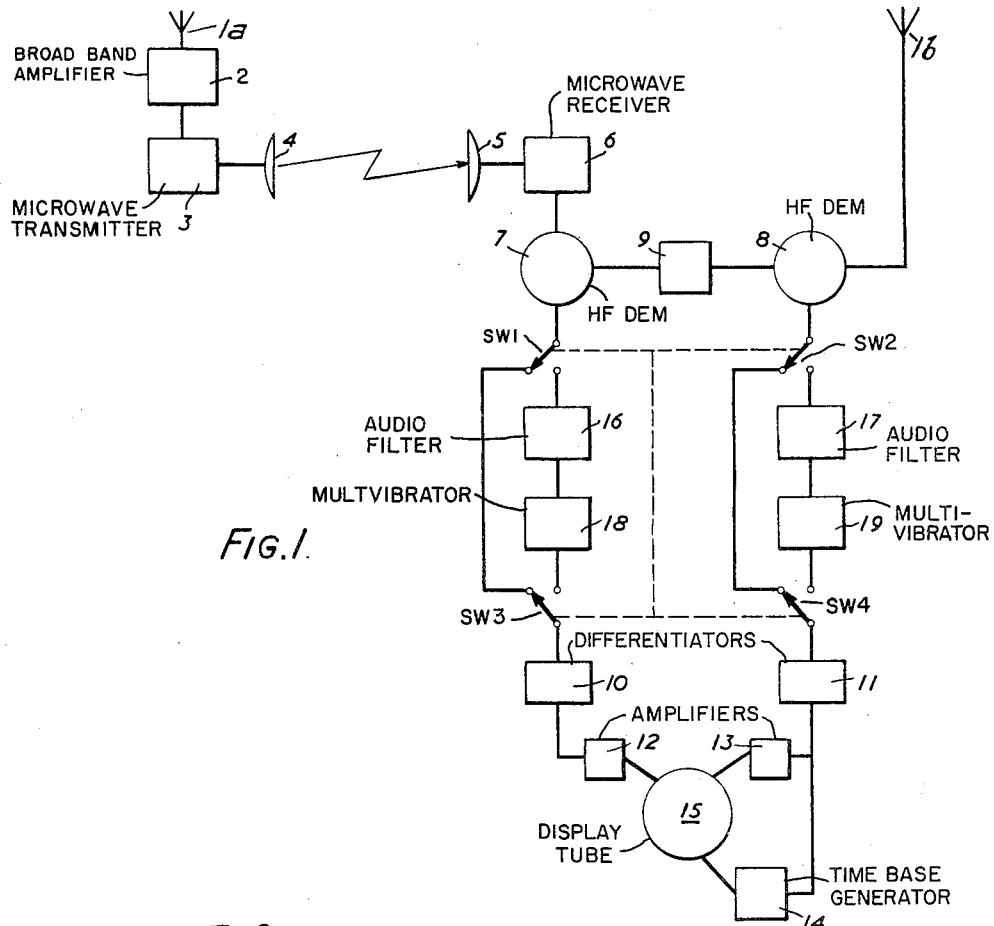
Figure 2A:
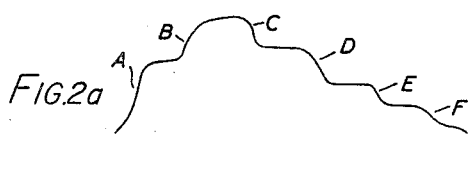
FIGURE 2a represents a typical keyed (Morse) waveform obtained at the output of one of the demodulators 7 or 8, the face A of this wave representing the first or direct signal received on the appropriate aerial 1a or 1b while the faces, B, C, D, E and F result from arrival of subsequent signals at the aerial due to multiple path transmission.
Figure 2B:
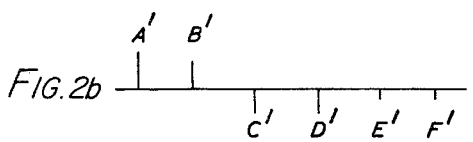
Figure 2C:
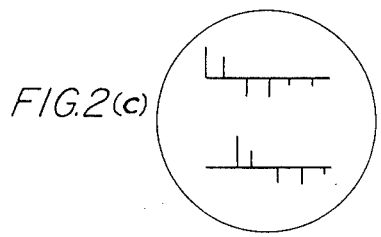

FIGURE 2c is a representation of the display on the tube 15 of FIGURE 1 showing the waveform of FIGURE 2b in two positions, one delayed with respect to the other, the upper display being representative of the signal from differentiator 11 of FIGURE 1 and the lower display being representative of the signal from differentiator 10. It will be appreciated that the time interval between these two displays is dependent on the time interval between the arrival, at aerials 1a and 1b, of corresponding signals and is therefore indicative of the direction of arrival at the aerials of these signals. Furthermore, due to the fact that the display tube 15 of FIGURE 1 is located close to aerial 1b and that the signals derived from aerial 1a are transmitted by means of a radio transmission path to the locality of aerial 1b, the minimum time interval, at the display tube 15, between corresponding signals from aerials 1a and 1b will be zero while the maximum time interval will be equal to twice the time of radio propagation between aerials 1a and 1b. Accordingly, the displacement of the first peak in the lower display in FIGURE 2c from the commencement of the time base sweep (i.e. the displacement from the first peak in the upper display in FIGURE 2c) is indicative of the direction of arrival of the waves received at aerials 1a and 1b.

The duration of the time base sweep of display tube 15 is made slightly larger than the greatest possible time interval between corresponding received signals at aerials 1a and 1b and as, in practice, the maximum time interval between different effective signals received due to multiple transmission is smaller than this value, there is little possibility of the time base generator 14 being triggered by any signal other than that due to an H.F. signal transmitted by the shortest path. Consequently, the displacement of the first peak of the lower representation in FIGURE 2c from the beginning of the time base sweep is indicative of the true direction of the signal source giving rise to the received signals, as it is indicative of the direction of arrival of a signal received by the shortest path from the signal source.

The aforementioned displacement may be measured by means of a cursor fitted to the display tube, a calibrated horizontal beam shift or by any other suitable known technique. Alternatively a variable delay device, such as a magnetic drum having a movable recording and/or reproducing head, may be provided in the path from amplifier 13 and adjusted until coincidence of the two traces on the display tube is obtained and the bearing read off from the adjustment member of the delay device.

As so far described the arrangement of FIGURE 1 is suitable for finding the incoming direction of signals carrying keyed (Morse) modulation. Where the incoming wave carried speech modulation, however, it is necessary to ensure, in order to prevent false operation, that the audio frequencies applied to the differentiators have a repetition period greater than the maximum time interval, at the display tube, between corresponding signals from the two aerials 1a and 1b. In the present case where the spacing between the aerials is 20 miles, and the aforesaid maximum time interval is, therefore, approximately 200 microseconds, this may conveniently be done by excluding all frequencies above, say 1 kc./s. Referring again to FIGURE 1, with switches SW1–SW4 in their other positions, the outputs from demodulators 7 and 8 are applied to audio filters 16 and 17, each having a pass band which may, conveniently, be 200–1000 c./s. The outputs from filters 16 and 17 are fed to wave squarers (for example multivibrators) 18 and 19 whose outputs are, in turn, fed to differentiators 10 and 11.

Figure 3A:
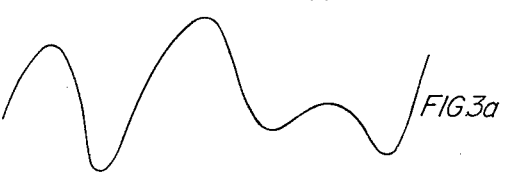
Figure 3B:
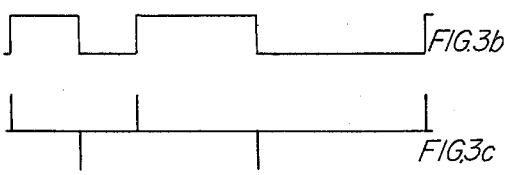
Figure 3C:
Figure 3D:
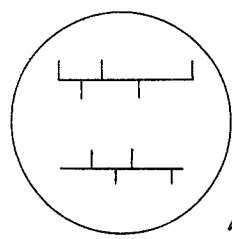

FIGURE 3a shows a typical output waveform from one of the audio filters 16 or 17, the variations in this waveform being primarily due to multiple path reception; FIGURE 3b shows the output, corresponding to the waveform of FIGURE 3a, from one of the wave squarers 18 or 19; and FIGURE 3c the corresponding output from one of the differentiators 10 or 11. FIGURE 3d shows, in manner similar to FIGURE 2c, the corresponding display on the display tube 15.

In a modification of the arrangement of FIGURE 1 the display tube 15 is a direct view storage tube which enables measurements to be made on short duration signals and serves to eliminate from the display transient variations caused, for example, by propagation irregularities.

It will be seen that in the above described embodiments of the invention it is possible accurately to measure the time interval at the display tube 15 between corresponding first arrival signals at the aerials 1a and 1b and therefore accurately to determine the direction of the source of the received waves.

The measurement thus obtained does not, of course, provide any sense indication but in cases where the source of signals will always be to one side of a line joining the two receiving aerials, this is not required. If sense indication is required, however, any convenient means known per se (for example a simple conventional direction finder) may be employed to determine the sense of the direction of the incoming waves.

Figure 4:
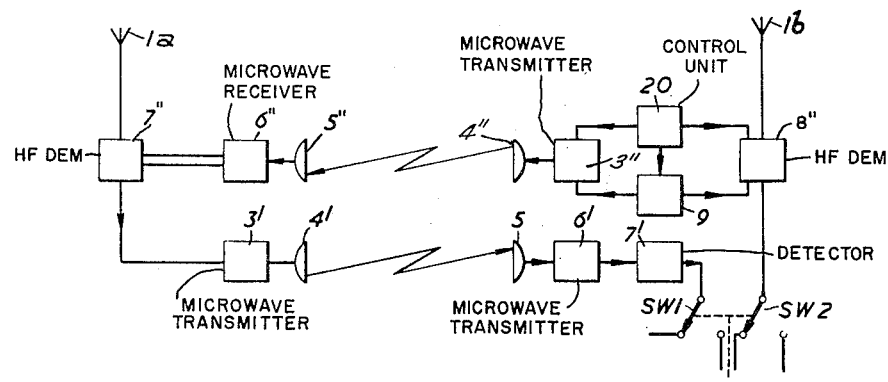

FIGURE 4 illustrates a modification which differs from that of FIG. 1 in that the signals which are transmitted to the common point for differentiation and time measurement or utilisation are intermediate frequency signals of a fixed pre-determined intermediate frequency derived by means including a common local oscillator situated at said common point and the local oscillations from which are transmitted over additional link means provided for that purpose. In practice said additional link means are also utilised for the transmission of receiver control signals e.g. for remote control of high frequency tuning.

Referring to FIG. 4 in which references corresponding to those of FIG. 1 are employed, a unit 7″ including H.F. demodulator means transforms the signals received on the aerial 1a to a fixed intermediate frequency output at, for example 465 kc./s. This intermediate frequency is produced by means of heterodyning oscillations produced by an oscillator 9, which is common to both the unit 7″ and a corresponding unit 8″ in which signals from the aerial 1b are transformed to the same intermediate frequency. The local oscillations from oscillator 9 are fed over an additional radio link including transmitter 3″, transmitting aerial 4″, receiving aerial 5″, and receiver 6″ to the unit 7″. This additional link is also employed for the transmission of remote control H.F. tuning and other desired control signals from a control box 20 which is schematically represented as providing control signals to the oscillator 9 and unit 8″ as well as to the transmitter 3″ for transmission to unit 7″. The intermediate frequency output from unit 7″ is fed over the link 3′4′5′6′ to the detector 7′ the output from which is fed to the switch SW1. The remainder of the equipment is not shown but is the same as in FIG. 1.

I claim:

1. A radio direction finder including means for separately demodulating and differentiating signals received at geographically spaced points from a transmitting modulated signal source and means for measuring the time interval between corresponding differentiated resultants first produced by a given transmitted signal to ascertain the direction of said source.

2. A direction finder as claimed in claim 1 wherein differentiation and time measurement are effected in a common station and signals derived from those received at any receiving point remote from said common station are transmitted from said receiving point to said common station by radio link means.

3. A direction finder as claimed in claim 1 wherein the whole arrangement is such that, for any possible direction of a transmitting source, the differentiated resultant derived from signals from a predetermined one of the receiving points cannot lag behind the corresponding differentiated resultant from any other receiving point at the station where time difference measurement is effected.

4. A direction finder as claimed in claim 3 wherein the differentiated resultant derived from signals from said predetermined point are employed to provide a datum time for time measurement.

5. A direction finder as claimed in claim 4 wherein said differentiated resultant is employed to trigger a deflecting time base for a cathode ray tube arranged distinguishably to display the different differentiated resultants derived from signals received at the different spaced points.

6. A direction finder as claimed in claim 5 wherein said cathode ray tube is a direct viewing storage tube.

7. A direction finder as claimed in claim 1 and including also means for ascertaining the sense of measured signal source directions.

8. A direction finder as claimed in claim 2 wherein the signals which are transmitted to the common station from each remote receiving point for differentiation and time measurement are intermediate frequency signals of a fixed intermediate frequency derived by means including a common local oscillator situated at said common station and additional radio link means for transmitting the oscillations from said common local oscillator to each remote receiving point.

9. A radio direction finder including means for separately demodulating and differentiating signals received at geographically spaced points from a transmitting modulated signal source; means for measuring the time interval between corresponding differentiated resultants first produced by a given transmitted signal to ascertain the direction of said source; and filter means for excluding, from the demodulated signals to be differentiated, signals having a repetition period not greater than the maximum time interval, at said measuring means, between corresponding signals from the different spaced receiving points.

10. A radio direction finder including means for separately demodulating and differentiating signals received at geographically spaced points from a transmitting modulated signal source; means for measuring the time interval between corresponding differentiated resultants first produced by a given transmitted signal to ascertain the direction of said source; filter means for excluding, from the demodulated signals to be differentiated, signals having a repetition period not greater than the maximum time interval, at said measuring means, between corresponding signals from the different spaced receiving points; and means arranged subsequent to said filter means for squaring the filtered signals.

11. A radio direction finder including means for separately demodulating and differentiating signals received at geographically spaced points from a transmitting modulated signal source; means for measuring the time interval between corresponding differentiated resultants first produced by a given transmitted signal to ascertain the direction of said source; filter means for excluding, from the demodulated signals to be differentiated, signals having a repetition period not greater than the maximum time interval, at said measuring means, between corresponding signals from the different spaced receiving points; means arranged subsequent to said filter means for squaring the filtered signals; and switching means for selectively connecting said filter means and said squaring means in circuit with said demodulating and differentiating means.

References Cited by the Examiner

UNITED STATES PATENTS

| | | | |
|---|---|---|---|
| 2,415,955 | 2/47 | Luck | 343—116 |
| 2,422,122 | 6/47 | Norton | 343—144.5 |
| 2,489,304 | 11/49 | Marchand et al. | |
| 2,637,841 | 5/53 | Davis et al. | 343—112 X |
| 2,684,474 | 7/54 | Kass | 343—112 X |
| 2,996,712 | 8/61 | Richman | 343—114.5 X |
| 3,078,415 | 2/63 | Frelich | 343—113 X |

CHESTER L. JUSTUS, *Primary Examiner.*